Figure 1:
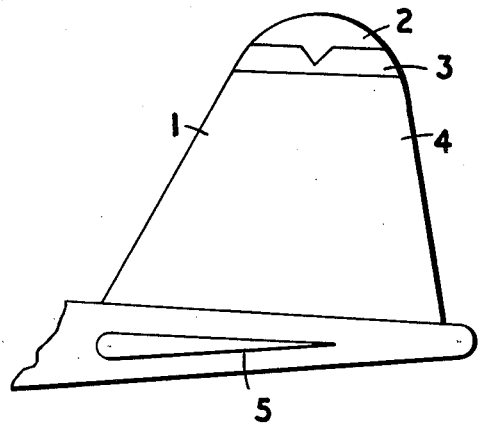

Feb. 1, 1955  R. H. J. CARY  2,701,307
RADIO ANTENNA FOR AIRCRAFT
Filed June 20, 1949  2 Sheets-Sheet 1

R. H. J. Cary
Inventor
By Moore and Hall
Attorneys

Feb. 1, 1955  R. H. J. CARY  2,701,307
RADIO ANTENNA FOR AIRCRAFT
Filed June 20, 1949  2 Sheets-Sheet 2

R. H. J. Cary
Inventor

By Moore and Hall
Attorneys

United States Patent Office 2,701,307
Patented Feb. 1, 1955

2,701,307

RADIO ANTENNA FOR AIRCRAFT

Rex Henry John Cary, Great Malvern, England, assignor, by mesne assignments, to National Research Development Corporation, London, England, a British corporation Application June 20, 1949, Serial No. 100,117

Claims priority, application Great Britain July 2, 1948

1 Claim. (Cl. 250—33)

The present invention relates to the installation of antennas in aircraft and especially in aircraft for high speed flying. Ideally such antennas are contained within the contours of the aircraft so as not to affect the aerodynamic qualities of the craft, and when so arranged are termed faired-in antennas. The antennas provided on aircraft are commonly required to transmit and receive vertically polarized electro-magnetic waves over a wide band of frequencies. Known forms of faired-in antennas comprise metallized portions of the wings or conductors associated with the wings which do not protrude from the contours of the wings and which are made to radiate at their resonant frequencies with some other part of the aircraft structure acting as a counterpoise ground. Difficulty has been experienced, however, in installing faired-in antennas which will resonate to frequencies of the order of 150 megacycles down to say 1 megacycle, and such antennas have so far been constructed of long wires and whip rods, faired-in antennas only being used for discrete bands in the very high frequency ranges.

An object of the invention in one aspect therefore, is to provide a faired-in antenna for aircraft which has omnidirectional transmitting and receiving properties, for vertically polarized electromagnetic waves in frequency bands of the high frequency and very high frequency ranges. In this respect it should be noted that, throughout the instant discussion, the terms "high frequency" and "very high frequency" are not utilized in their strictly technical sense.

A further object of the invention is to provide a faired-in antenna for aircraft which has omnidirectional transmitting and receiving properties for vertically polarized electromagnetic waves over a wide range of frequency bands in the high frequency and very high frequency ranges.

A still further object of the invention is to provide such an antenna which will operate over a number of contiguous bands of frequencies in the high frequency and very high frequency ranges.

According to the present invention in one aspect there is provided a faired-in antenna comprising a conductive tip-portion to the tail fin of an aircraft, separated from the conductive surfaces of the rest of the aircraft by means of an insulating section. The tip-portion of the tail fin is so dimensioned with respect to the whole tail fin and the tail plane that when the antenna system so formed is fed across the insulating section it provides efficient omnidirectional radiation and reception for vertically polarized electromagnetic waves for at least two desired frequency bands, by means of the tip-portion of the tail fin acting (a) as a near-end feed to the whole tail fin operating as an antenna with the tail plane acting as a counterpoise ground, and (b) as a unipole operating at its own resonant frequencies. It is found that when an antenna system is formed in this manner there is a still further frequency band for which efficient omnidirectional radiation and reception of vertically polarized electromagnetic waves is obtained, by means of the conductive tip-portion of the tail fin acting as a near-end feed to the aircraft as a whole operating as an antenna. The invention may therefore be carried into effect by providing a faired-in antenna comprising a conductive tip-portion to the tail fin of an aircraft separated from the conductive surfaces of the rest of the aircraft by an insulating section, the tip-portion of the tail fin being so dimensioned with respect to the whole tail fin, the tail plane and the whole aircraft that when the antenna system so formed is fed across the insulating section it provides efficient omnidirectional radiation and reception for at least three desired frequency bands by means of the tip-portion of the tail fin acting alternatively as a near-end feed to the aircraft as a whole operating as an antenna, as a near-end feed to the whole tail fin operating as an antenna with the tail plane acting as a counterpoise ground and as a unipole operating at its own resonant frequencies. In a further development of the invention, the tip-portion of the tail fin is so dimensioned with respect to the tail fin as a whole, the tail plane and the whole aircraft that efficient omnidirectional radiation and reception for vertically polarized electromagnetic waves is obtained for at least three contiguous frequency bands in the high frequency and lower very high frequency ranges. According to the invention in a further aspect, the conductive tip-portion of the tail fin is broken up into a plurality of insulated conductive portions each placed one above the other and each fed by its own feeder and frequency filter system, their dimensions being so chosen that each acts as a resonant antenna with the insulated portion immediately below it acting as a counterpoise ground so that efficient omnidirectional radiation and reception of vertically polarized electromagnetic waves is obtained in further frequency bands in the very high frequency range. The lowest insulated portion is so dimensioned in relation to the whole tail fin, the tail plane and the whole aircraft, bearing in mind the considerations above described that efficient omnidirectional radiation and reception may be obtained for vertically polarized electromagnetic waves over a plurality of desired frequency bands, or contiguous frequency bands, in the high frequency and very high frequency ranges.

The ratio of width to length of all the antenna combinations so created is sufficiently large to provide wide band operation in all the frequency bands covered.

The antennas so constructed may be fed from coaxial line feeders which may contain frequency filters so that the signals received by the antennas are directed down the appropriate channel to the Radio Communication or Radar equipment working on any predetermined frequency band, without interference from transmission or reception on any other frequency band.

In one embodiment of the invention the aircraft may be constructed from either metallic sheeting or a "skin" of fabric sprayed with a metallic coating. The tail fin is similarly constructed except that the tip-portion is insulated from the rest of the fin by a non-conducting plastic section. A coaxial feeder has its inner conductor connected to the tip-portion and its outer conductor to the tail fin body. Alternatively any number of coaxial feeders may be connected in this manner and may comprise frequency filters to prevent frequencies other than those within a band on which an equipment is working from being fed to that equipment.

Figures 2, 3:
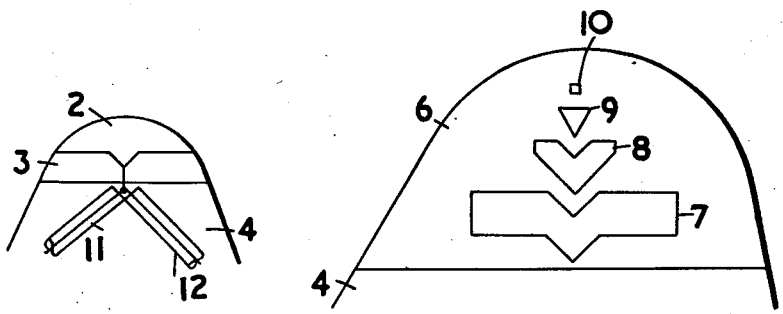
Figure 4:
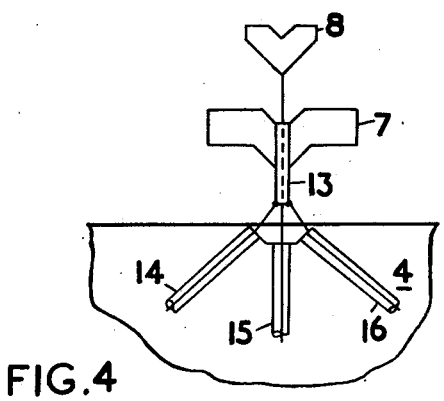
Figure 5:
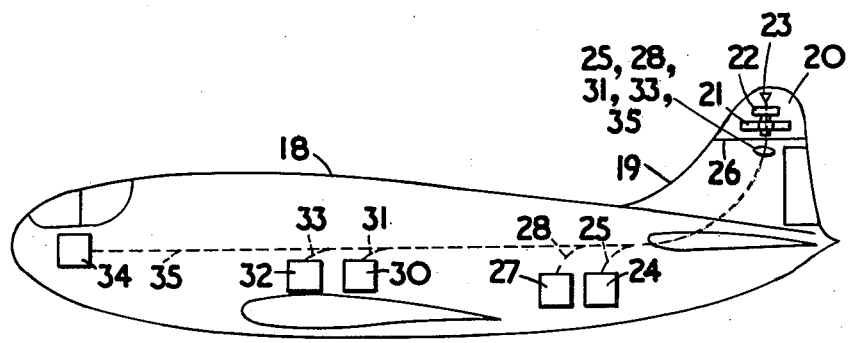
Figure 6:
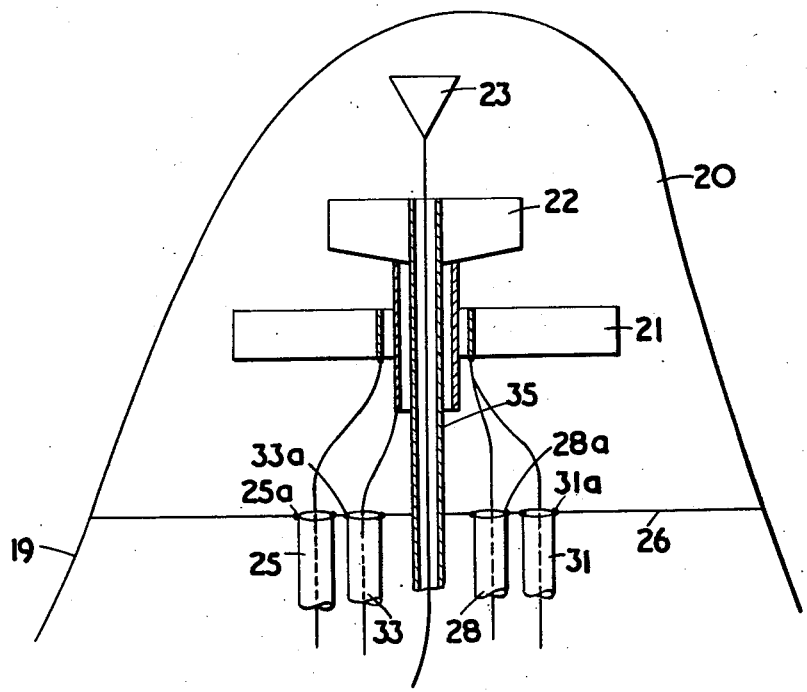

In order that the invention may be more clearly understood, embodiments thereof will now be described with reference to the accompanying drawings, in which, Fig. 1 shows a side view of a rear portion of an aircraft incorporating an antenna system according to the invention, Fig. 2 shows a diagrammatic view of feeding arrangements for the antenna system shown in Fig. 1, Fig. 3 shows a side view of a further antenna system according to the invention, Fig. 4 shows feeding arrangements for the antenna system shown in Fig. 3, Fig. 5 shows diagrammatically an aircraft in which various radio equipments are connected to an antenna system according to the invention, and Fig. 6 shows certain details of connections of the antenna system of Fig. 5.

Fig. 1 shows the rear portion of an aircraft, comprising a tail fin 1, a metallic tip portion 2 to the tail fin 1, a plastic strip 3 insulating the tip-portion 2 from the body 4 of the tail fin and the tail plane 5. Substantially the whole of the aircraft except the insulating plastic strip 3 is covered with a metal or a metallized fabric "skin." The dimensions of the said tip-portion 2 are so chosen in relation to the dimensions of the body 4 of the tail fin, the tail plane 5 and the aircraft as a whole, that when suitably fed it will act as an efficient omnidirectional antenna over at least three frequency bands in the high frequency and lower very high frequency ranges. This antenna system is fed by means of a coaxial feeder system which may be constructed to accommodate any number of frequency bands. Such a feeder system to accommodate two frequency bands is shown diagrammatically in Fig. 2. Coaxial feeders 11 and 12 have their outer conductors connected to the body 4 of the tail fin and their central conductors to the tip-portion 2. Frequency filters are included within these coaxial feeders to pass any desired band of frequencies to the equipments to which they are connected.

When the tip-portion 2 is fed in this manner, and is excited by appropriate frequency bands it operates alternatively in three modes of excitation. These modes are, (a) as near-end feed to the aircraft acting integrally as an antenna, (b) as near-end feed to the body 4 of the tail fin with the tail plane 5 acting as a counterpoise ground and (c) as a unipole operating at its resonant frequencies, the body 4 of the tail fin acting as a counterpoise ground. In all these modes of operation the effective width to length ratio of the antennas is large and the frequency bands for which the system is effective are therefore wide. In this way it is possible to obtain frequency coverage from approximately 2 to 150 megacycles for a large aircraft of say 100 foot wingspan.

Fig. 3 shows a development of the invention in which the tip-portion 2 of Fig. 1 is broken up into a number of insulated metallic portions, 7, 8, 9 and 10, each placed vertically above the other in an insulating plastic support or structure 6. In this arrangement, the metallic portion 7 acts in conjunction with the rest of the aircraft, the body of the tail fin and the tail plane as previously described with reference to the said tip-portion 2 of Fig. 1. The portion 8 of the tip-portion is so shaped, dimensioned and fed that it will act as an omnidirectional antenna in an additional frequency band in the very high frequency range. The portion 7 acts as a counterpoise ground thus reducing the interaction between the portion 8 and the other metallized parts of the aircraft. Employing similar dimensional considerations and methods of feeding, portions 9 and 10 can be similarly employed, each using a portion immediately vertically below it as a counterpoise ground so that frequency coverage can be obtained over two further frequency bands in the very high frequency range.

The invention is not restricted to a system wherein the tip-portion is divided up into four insulated portions, and the tip-portion may be divided into any desired number of portions stacked one above the other so that frequency coverage is provided over all practical frequency bands in the high frequency and very high frequency ranges.

Fig. 4 shows one method of feeding portions 7 and 8 by means of coaxial feeders wherein it is only required to filter three frequency bands to associated equipments. The outer conductor of a coaxial feeder 13 is connected to the metallic portion 7 and the inner conductor is connected to the metallic portion 8, and also to the inner conductor of a coaxial feeder 15, the outer conductor of which is connected to the body 4 of the tail fin. The outer conductor of the coaxial feeder 13 is also connected to the inner conductors of coaxial feeders 14 and 16, the outer conductors of which are also connected to the body 4 of the tail fin. The coaxial feeders, 14, 15 and 16 comprise frequency filter units which direct the appropriate frequency band to equipments carried by the aircraft.

In Fig. 5 is shown a typical arrangement in an aircraft of radio equipments connected to an antenna system according to the invention. Fig. 6 shows connection details at the tail-fin.

An aircraft 18, having a conducting skin, is constructed with a tail-fin body 19 to which is attached a tip member 20 made of insulating material. In the tip member 20 are inserted conducting antenna portions 21, 22 and 23 which are, of course, insulated from each other by the insulating material.

The conductive portion 21 (insulated from the other conducting antenna portions) acts:

a. In conjunction with a radio equipment 24 to which it is connected by a coaxial feeder 25. The outer conductor of feeder 25 is connected to the conducting skin of the aircraft at a point 25a along the edge 26 of the tail-fin body 19. The inner conductor of feeder 25 is connected to the portion 21. An antenna system operating over a band of frequency, within which the radio equipment 24 tunes, is thus provided in which the portion 21 acts as a near-end feed to the rest of the aircraft as a whole operating as an antenna.

b. In conjunction with a radio equipment 27 to which it is connected by a coaxial feeder 28. The outer conductor of the feeder 28 is connected to the conducting skin of the aircraft at a point 28a along the edge 26 of the tail-fin body 19. The inner conductor of feeder 28 is connected to the portion 21. An antenna system operating over a band of frequencies within which the radio equipment 27 tunes, is thus provided in which the portion 21 acts as a near end feed to the body of the tail-fin 19 acting as an antenna and the tail-plane 29 acting as a counterpoise ground.

c. In conjunction with a radio equipment 30 to which it is connected by a coaxial feeder 31. The outer conductor of the feeder 31 is connected to the conducting skin of the aircraft at a point 31a along the edge 26 of the tail-fin body 19. The inner conductor of feeder 31 is connected to the portion 21. An antenna system operating over a band of frequencies within which the radio equipment 30 tunes, is thus provided in which the portion 21 acts as a unipole operating within its own resonant frequency range.

The conductive portion 22 (insulated from the other conducting antenna portions) acts:

a. In conjunction with a radio equipment 32 to which it is connected by a coaxial feeder 33. The outer conductor of the feeder 33 is connected to the conducting skin of the aircraft at a point 33a along the edge 26 of the tail-fin body 19. The inner conductor of feeder 33 is connected to the portion 22. An antenna system operating over a band of frequencies within which the radio equipment 32 tunes, is thus provided in which the portion 22 acts as a unipole operating at its own resonant frequency.

b. As a counterpoise to portion 23 in conjunction with a radio equipment 34 to which portions 22 and 23 are connected by a feeder 35. The outer conductor of the feeder 35 is connected to the portion 22 and the inner conductor to the portion 23. An antenna system operating over a band of frequencies, within which the radio equipment 34 tunes, is thus provided in which the portion 22 acts as a counterpoise to the portion 23.

In the feeders 25, 28, 31, 33 and 35 filters may be connected and tuned to the pass bands of which are arranged to correspond with the frequency ranges of the radio equipments 24, 27, 30, 32 and 34 respectively.

It will be appreciated by those versed in the art that this type of feeder arrangement is not confined to a system requiring operation on three frequency bands, nor to a system comprising only two conductive portions to the tip-portion, but may be applied to a system comprising any number of such conductive portions and to filter their respective operating frequencies to their associated equipment.

I claim:

The combination, in an aircraft radio system, of an aircraft having an electrically conductive structure, means for electrically insulating a conductive tip-portion of the tail fin of the aircraft from the remainder of the aircraft, whereby the aircraft itself constitutes a radiation system for electromagnetic waves in wavebands determined according to the dimensions of the aircraft in which the tip-portion acts: (a) as a resonant unipole in conjunction with the remainder of the aircraft acting as a ground, (b) as a near-end feed to the tail-fin acting as a resonator with the remainder of the aircraft acting as a ground, and (c) as a near-end feed to the rest of the aircraft acting integrally with the tail-fin as a resonator, a plurality of radio equipments each operating within a predetermined frequency band which is itself embraced by the aforementioned wavebands the frequency band of at least one radio equipment being chosen from waveband (a), and feeders connecting each of the radio equipments to the aircraft across the insulating means, each feeder having one conductor connected to the tip-portion and its other conductor connected to the remainder of the aircraft.

(References on following page)

References Cited in the file of this patent

UNITED STATES PATENTS

| | | | |
|---|---|---|---|
| 1,934,602 | Gilman | Nov. 7, | 1933 |
| 1,933,941 | Taylor | Nov. 7, | 1933 |
| 1,965,539 | Amy | July 3, | 1934 |
| 2,235,139 | Bruce | Mar. 18, | 1941 |
| 2,279,130 | Bruce | Apr. 7, | 1942 |
| 2,358,520 | Landon | Sept. 19, | 1944 |
| 2,368,663 | Kandoian | Feb. 6, | 1945 |
| 2,474,480 | Kearse | June 28, | 1949 |
| 2,518,843 | Wehner | Aug. 15, | 1950 |
| 2,589,664 | Bowman | Mar. 18, | 1952 |
| 2,612,606 | Wehner | Sept. 30, | 1952 |

FOREIGN PATENTS

| | | | |
|---|---|---|---|
| 530,220 | Great Britain | Dec. 6, | 1940 |
| 125,006 | Sweden | May 24, | 1949 |

OTHER REFERENCES

Electronics, June 1948, page 184.
Tele-Tech, page 37, July 1949.